United States Patent [19]

Houng

[11] Patent Number: 4,689,822

[45] Date of Patent: Aug. 25, 1987

[54] HEADSET

[76] Inventor: Huang-Chiang Houng, No. 138, Chung-Hsing Street, Kaohsiung, Taiwan

[21] Appl. No.: 823,533

[22] Filed: Jan. 29, 1986

[51] Int. Cl.[4] .............................................. H04M 1/05

[52] U.S. Cl. ..................................... 381/183; 381/187

[58] Field of Search ........... 179/156 R, 156 A, 182 R, 179/182 A; 181/129; 381/183, 187

[56] References Cited

U.S. PATENT DOCUMENTS

| | | | |
|---|---|---|---|
| 1,866,043 | 7/1932 | Königsberger | 179/156 R |
| 4,455,457 | 6/1984 | Akira | 179/156 R |
| 4,472,607 | 9/1984 | Houng | 179/156 R |
| 4,499,593 | 2/1985 | Antle | 179/156 R |
| 4,588,868 | 5/1986 | Bertagna et al. | 179/156 R |

FOREIGN PATENT DOCUMENTS

| | | | |
|---|---|---|---|
| 0071464 | 2/1983 | European Pat. Off. | 179/156 R |
| 2854854 | 7/1980 | Fed. Rep. of Germany | 179/156 R |
| 3,225,812 | 2/1983 | Fed. Rep. of Germany | 179/156 R |

OTHER PUBLICATIONS

"New Breakthrough in Headphone Design", *Radio Electronics*, Jun. 1981, pp. 51-53.

*Primary Examiner*—Gene Z. Rubinson
*Assistant Examiner*—Danita R. Byrd
*Attorney, Agent, or Firm*—Bacon & Thomas

[57] ABSTRACT

An improved headset of the type including a headband having two ends provided with sliding portions, wherein a pair of adjusting pieces are slidably received through the sliding portions to permit adjusting the height of the adjusting pieces with respect to the headband. The lower end of each adjusting piece is provided with a seat having a connecting member formed on the bottom thereof. A pair of main bodies, each body including a speaker and an ear cushion, are pivotally connected to the connecting members of the adjusting pieces so as to permit the main bodies to be rotated about the longitudinal axis of the headband.

1 Claim, 7 Drawing Figures

HEADSET

BACKGROUND OF THE INVENTION

This invention relates to an improved headset.

Headsets of the type preferred to are all well known in the prior art; however, the conventional ear cushions can only be adjusted in height but can not be rotated about the longitudinal axis of the headband. Since the ears of each user are positioned differently, the headsets can not satisfactorily adapt to the needs of everybody.

It is, therefore, an object of the present invention to obviate the above-noted drawback.

SUMMARY OF THE INVENTION

It is the primary object of the present invention to provide an improved headset of which the main bodies can be adjusted in height with respect to the headband by means of two sliding seats formed at the ends of said headband in association with two adjusting pieces respectively fitted into said sliding portions.

It is another object of the present invention to provide an improved headset of which the main bodies can be rotated about the longitudinal axis of the headband by means of the connecting members of the adjusting pieces in association with the connecting portions of the main bodies.

It is still another object of the present invention to provide an improved headset which is arranged to slightly contact the user's ears so as to make the user feel comfortable and enjoy the music in a relaxed manner during travel.

It is a further object of the present invention to provide an improved headset which is economical to fabricate and practical for use.

BRIEF DESCRIPTION OF THE DRAWINGS

FIG. 1—1 is a cross-sectional view taken along the line A—A of FIG. 1;

FIG. 3—1 is a cross-sectional view thereof illustrating the main body of a preferred embodiment of the present invention;

FIG. 3-2 is another cross-sectional view thereof showing the connecting member capable of being rotated through an angle of 180° between the two positioning plates of the main body.

DETAILED DESCRIPTION OF THE PREFERRED EMBODIMENT

Figure 1:
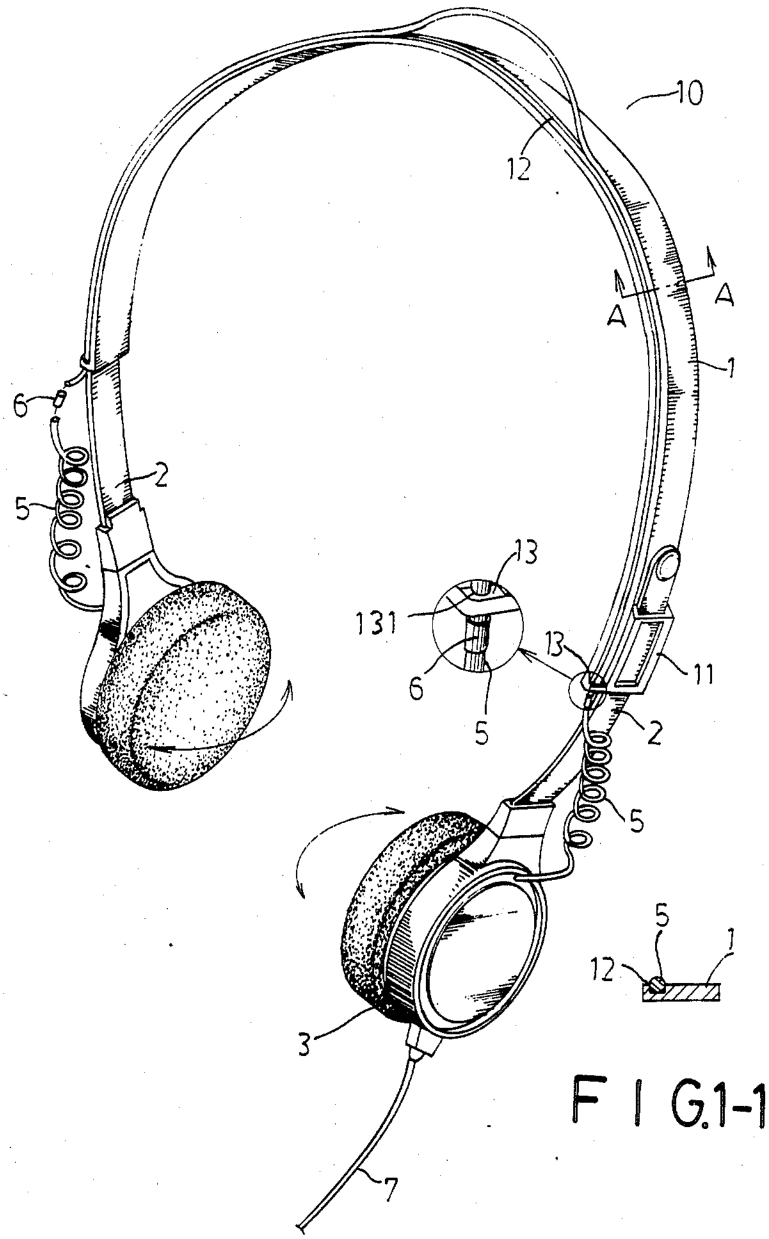
FIG. 1 is a perspective view of a preferred embodiment of the present invention.
Figure 2:
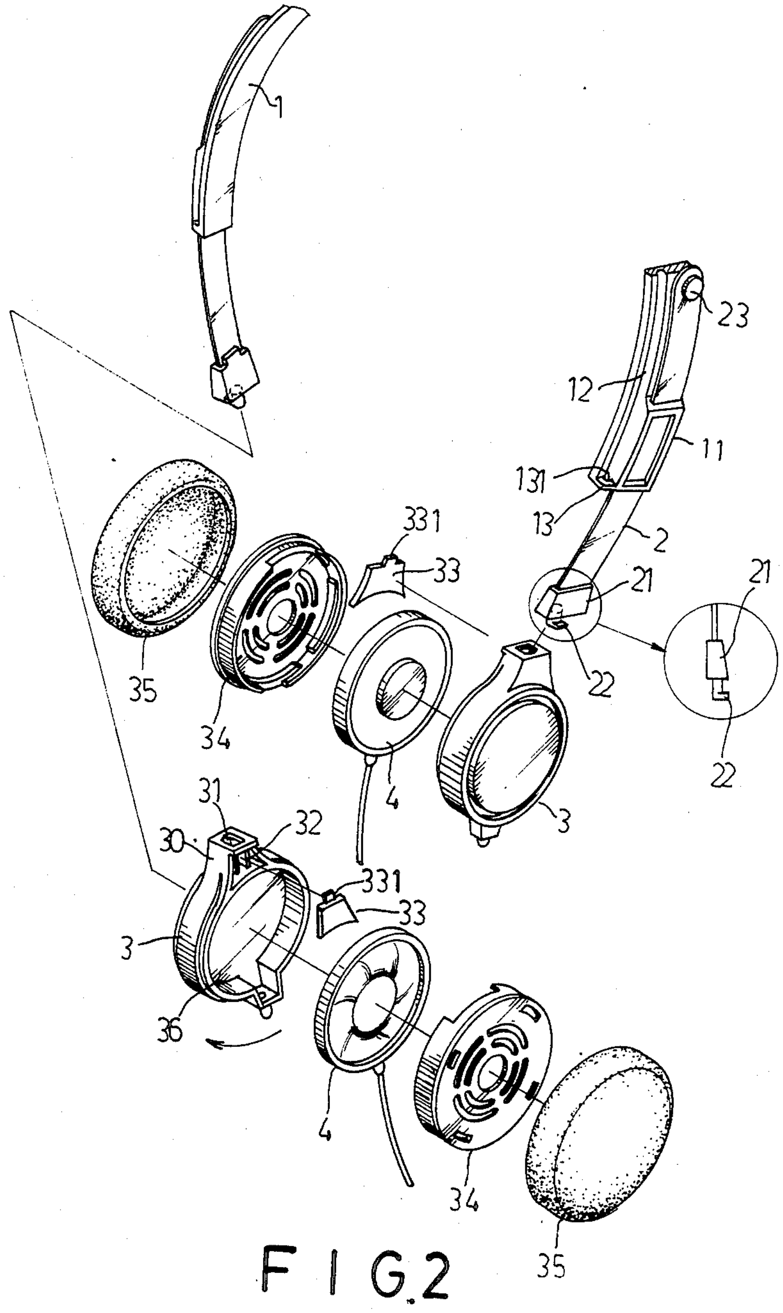
FIG. 2 is a partial fragmentary perspective view of FIG. 1.

Referring to the drawings and particularly to FIGS. 1 and 2 thereof, an improved electric headset (10) according to the present invention comprises a headband (1), a pair of adjusting pieces (2) and a pair of main bodies (3).

Figures 1, 3:
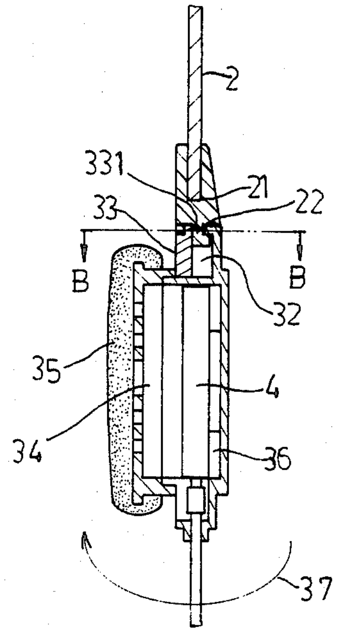
Figures 2, 3:
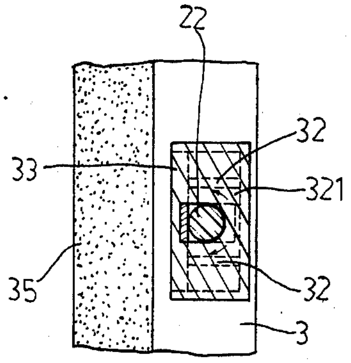

The headband (1) is provided at each end with a sliding portion (11) of which both ends are opened. Each adjusting piece (2) provided at one end thereof with a flange (23) can be properly fitted into each sliding portion (11) and slides therein thereby being capable of adjusting in height with respect to the headband. The lower end of each adjusting piece (2) is formed with a seat (21) of which the lower end is provided with a connecting member (22). The main body (3) is provided at the top thereof with a connecting portion (30) in which a pair of positioning plates (32) are disposed in parallel to form a space (321) therebetween (FIG. 3—2). The upper side of the connecting portion (30) is provided with an aperture (31) for receiving the connecting member (22) of the adjusting piece (2). A flat plate (33) having a flange (331) on the top thereof is arranged to be secured to the connecting portion (30) with the flange (331) passing through the aperture (31).

In assembling, referring to FIG. 2, firstly the connecting member (22) of the adjusting piece (2) is inserted into the connecting portion (30) through the aperture (31) thereof, so that the connecting member (22) is located between the space (321) formed by the positioning plates (32). Secondly, referring to FIG. 3—1, the main body (3) is rotated from the original position as shown in the right-hand side of FIG. 2 along the direction of arrow (37) through an angle of 180° about the longitudinal axis of the headband (1). Thirdly, the plate (33) is secured to the positioning plates (32) with its flange (331) passing through the aperture (31) of the connecting seat (30). Then a speaker (4) is received in the recess (36) which is formed in the middle portion of the main body (3). Finally, a cover (34) is fixedly secured to the main body (3) to prevent the speaker (4) from dropping out thereof. A ear cushion (35) is attached to the cover (34) to be suitable for the user's ear. In such an arrangement, the connecting member (22) thereof can be freely rotated through an angle of 180 degrees within the space (321) formed between the two positioning plates (32) as shown in the imaginary line of FIG. 3—2. That is, the main body (3) can be adjusted to rotate about the longitudinal axis of the headband (1) through an angle of 180° thereby permitting said main body (3) to better accomodate and fit the ears of different users. Besides, the main body (3) is arranged to slightly contact the user's ear so as to make the user feel comfortable and enjoy the music in a relaxing manner during travel.

Furthermore, referring to FIGS. 1 and 2, the headband (1) is provided along the length with a groove (12) of which the both ends are closed by a pair of end plates (13) each having a hole (131) thereon. A electric wire (5) is connected at one end to one of the speaker (4) and passes through one of the holes (131), the groove (12), the other hole (131) and then is connected at the other end to the other speaker (4) to which an acoustic pipe 7 served for transmitting music or the like is connected. This single wire arrangement can significantly increase the flexibility of this invention and has never been used in the conventional headset system. A pair of rubber sleeves (6) are respectively disposed at both ends of the groove (12) of the headband (1) to hold the electric wire (5) in its position.

Figure 4:
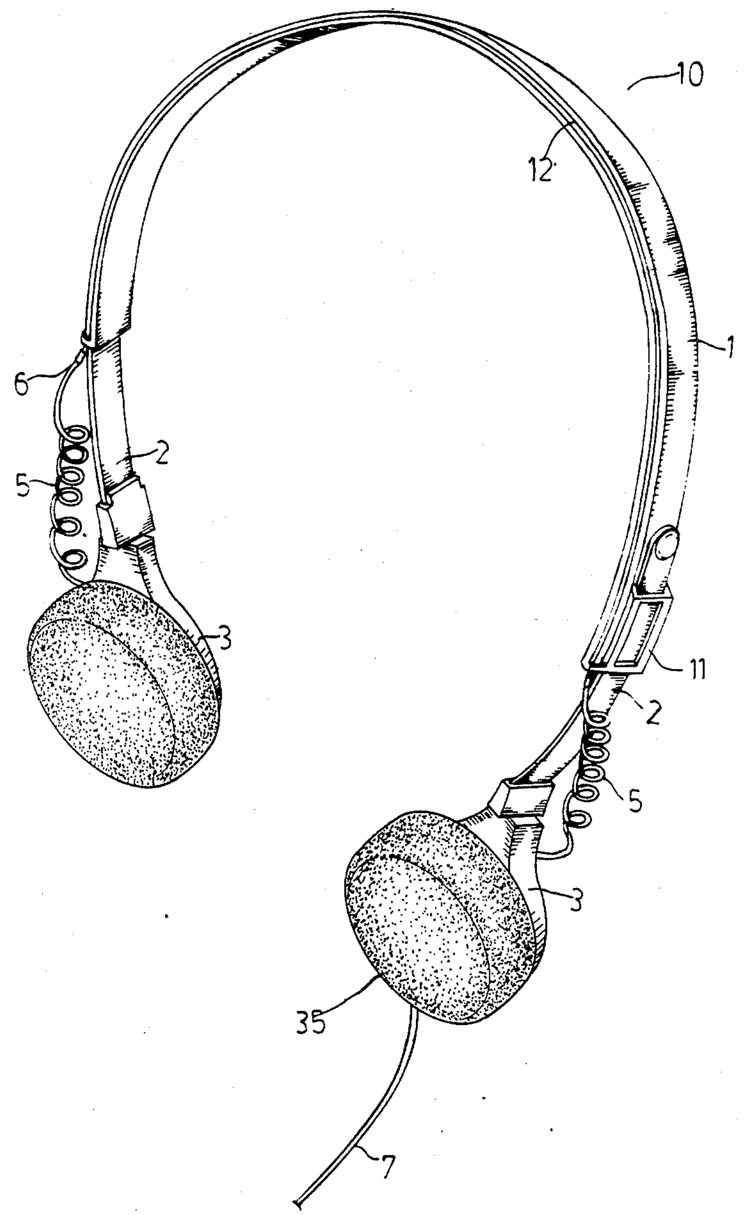
FIG. 4 is a perspective view thereof showing the main bodies of the headset can be rotated in parallel to the longitudinal axis of the headband thereby saving the transportation space.

It is noted that, referring to FIG. 4, the main bodies (3) of the headset (10) can be rotated in parallel to the length of the headband (1) thereby being capable of saving the transportation space.

Figure 5:
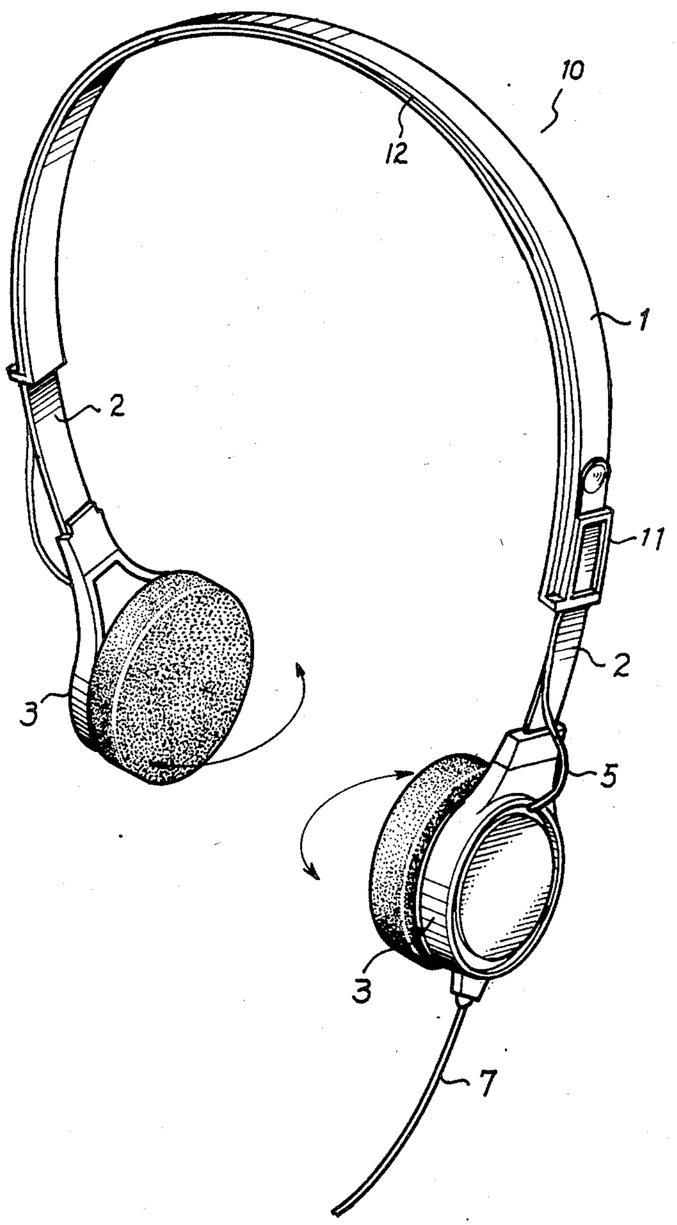
FIG. 5 is a perspective view of an alternative embodiment of the present invention wherein the electric wire is in a straight type.

FIG. 5 shows an alternative embodiment of the present invention wherein the electric wire (5) thereof is formed as a straight type instead of the coil type shown in FIG. 1.

I claim:

1. An improved headset comprising:

(a) an elongate headband having two ends, each end being provided with a sliding portion, each sliding portion including a terminal end, a groove formed along the length of the headband, the groove terminating at terminal ends of the sliding portions, each terminal end of the sliding portion being provided with an end plate having a hole therethrough for receiving an electric wire;

(b) a pair of adjusting pieces, each adjusting piece including upper and lower ends wherein each upper end is provided with a flange, each adjusting piece being slidably fitted into a respective sliding portion of the headband, the lower end of each adjusting piece being provided with a seat, the seat including a connecting member;

(c) a pair of main bodies, each main body including a top provided with a connecting portion defining a cavity, a pair of positioning plates disposed in parallel within the cavity and forming a space therebetween, each connecting portion including an upper side provided with an aperture configured for receiving the connecting member of each adjusting piece, a pair of closure plates, each closure plate being provided with a flange, the connecting member of each adjusting piece being inserted into each connecting portion through the aperture thereof with the connecting member being located within the space formed by the corresponding positioning plates, each closure plate being secured to a corresponding connecting portion whereby the flange of each closure plate passes through the aperture of the connecting portion for securing the connecting member to the connecting portion and permitting the main body to be rotated through an angle of 180 degrees about the longitudinal axis of the headband;

(d) a pair of speakers, each speaker being carried by a main body;

(e) a pair of covers, each cover being secured to each main body for securing the speaker thereto;

(f) a pair of ear cushions, each ear cushion being attached to a cover;

(g) a single electric wire connected between the two speakers, the wire passing through the holes of the endplates and received within the groove of the headband; and (h) a pair of rubber sleeves, each sleeve being disposed at a terminal end of the groove for securing the electric wire in position.

* * * * *